June 13, 1939. J. A. PETERMAN 2,162,340
BRACKET FOR ATTACHING CONDUITS TO WALLS
Filed Oct. 8, 1937

INVENTOR.
Joseph A. Peterman
BY Waldo M. Chapin
ATTORNEY.

Patented June 13, 1939

2,162,340

UNITED STATES PATENT OFFICE 2,162,340

BRACKET FOR ATTACHING CONDUITS TO WALLS

Joseph A. Peterman, New York, N. Y.

Application October 8, 1937, Serial No. 167,996

1 Claim. (Cl. 248—74)

This invention relates to an appliance for attaching a conduit or the like to a supporting structure, especially to a bracket for attaching a leader from the gutters of a building to the exterior wall thereof, and more particularly relates to the provision of such a bracket fabricated of wire.

An object of the invention is to provide, as a new article of manufacture, an attaching bracket for such a conduit comprising a brace of wire spans designed to embrace said conduit circumferentially; said spans being spaced apart lengthwise of the major axis of the conduit, and the wire of each span being bent near each end of the span toward the corresponding end of the other span; said wire ends being associated to form an attaching member common to both spans at each end thereof.

Another object of the invention is to provide such a bracket in which each of the attaching members is formed with means by which it may be readily secured to the supporting structure; and as a feature ancillary to the above objects to form each of the attaching members with a portion of the wire component bent to provide an orifice adapted to receive a securing device, such as a screw or a nail driven into the supporting structure.

Among other objects of the invention is to provide for supporting the conduit in such a manner that a substantial space will exist between the conduit and the attaching members so that the conduit will be spaced at a desired distance from the wall of the house or other supporting structure.

A further object of the invention is to provide for the fabrication of such a bracket from a single piece of wire; also to provide for a bracket having the features above mentioned and formed of wire having a resilient characteristic, whereby the bracket is self maintaining upon the conduit when assembled therewith, and is thus so disposed as to make it easy to complete the attachment of the bracket to the supporting wall, leaving the hands of the workman free to manipulate the nails and hammer or the screws and screwdriver, etc.

Still another object of the invention is to provide a bracket which is capable of use in effecting the attachment of members such as electrical cables, or any combined plurality of articles and articles generally which in their unitary or combined structure may approximate the shape of a conduit, it being understood that the term "conduit" is hereinafter used in the specification and claim in a generic, rather than in a limitative sense, unless the claim is otherwise specifically restricted.

Other objects are to provide a device of the character described which is of simple construction, which is cheap to manufacture, which may be readily and quickly applied, which is ornamental in character, and which is efficient in operation.

These and other objects of the invention will appear in the following description, taken in connection with the accompanying drawing, in which.

Figure 1:
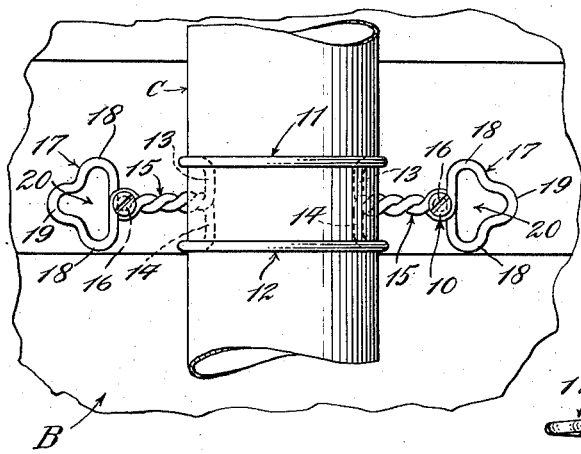
Fig. 1 is a view in front elevation of a bracket in the construction of which the present invention has been embodied, the same being shown in place upon a section of a drainage leader attached to a supporting portion of the exterior wall of a building.

In the now preferred embodiment of the invention selected for illustration and description, the parts designated by the reference characters 11 and 12 are spans of wire each constituting a component part of a bracket, which, in pursuance of the invention, is applied to a conduit C, this conduit being constituted, in the instance illustrated, by a sheet metal leader for carrying off water from the roof of a building of which a portion is illustrated at B.

The brace of spans 11 and 12 is so formed that the wire components are spaced apart along the major axis of the conduit and preferably the component wire has a somewhat resilient characteristic, so that the spans 11 and 12, which are shown as encircling a substantial portion of the leader's circumference, will tend to grip the leader and hold the bracket in place, thus aiding to dispose it conveniently for attachment to the building structure by suitable means.

As one convenient form of attaching members for the above purpose the wire of each span is bent, as at 13 and 14, near each end of the span, toward the corresponding end of the other span, said wire ends being associated in any suitable manner to form an attaching member common to both spans at each end thereof.

In the present instance this association is accomplished by twisting the wire ends together as indicated at 15, and in bending the wire for this purpose an orifice 16 is formed in each attaching member to receive a securing device such as a screw or a nail driven into the supporting structure, as indicated at 10.

In further pursuance of the invention the wire ends are further bent to constitute at each end a terminal in the form of an ornamental open loop designed to impart stability to the attachment members and to the bracket and thus also to the conduit supported thereby. Such terminals are indicated by the reference character 17, and each such terminal may desirably have the trefoil shape illustrated, comprising upper and lower loops 18 and an end loop 19 defining an open space 20.

It will be seen readily that, if desired, additional fastening devices may be driven through the opening 20 at the region of one or more of the above mentioned loops to impart additional rigidity to the bracket, and it will be understood also that as many of the brackets as necessary will be supplied, for the purpose of holding the conduit against displacement in any direction.

The extent to which the wire spans 11 and 12 embrace the circumference of the conduit will be governed by considerations known to those skilled in the art, and it will be seen that my improved bracket lends itself readily to application to leaders in which there is some variation in diameter, it being possible to bend the wire components readily with the use of such tools as are ordinarily available.

Figure 2:
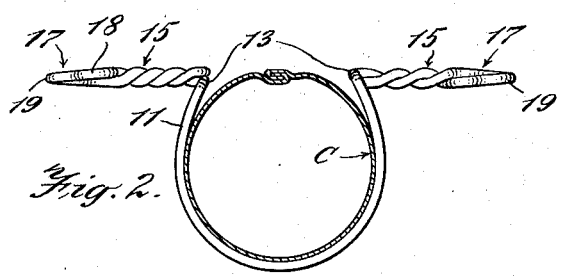
Fig. 2 is a view in horizontal section of the parts shown in Fig. 1.
Figure 3:
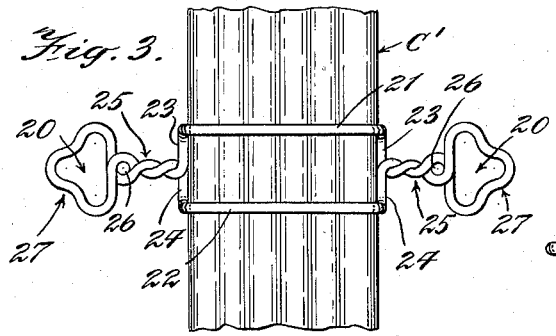
Fig. 3 is a view similar to Fig. 1 of a modified bracket associated with a leader of oblong cross-section.
Figure 4:
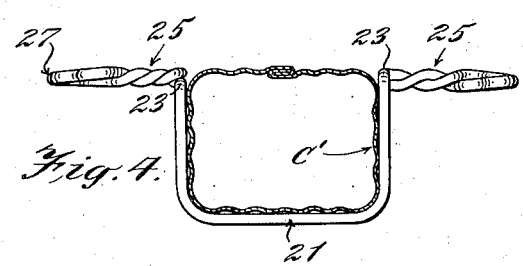
Fig. 4 is a view in horizontal section of the parts shown in Fig. 3.

In Fig. 2, illustrating an installation where the conduit is tangent to the wall surface by which it is supported, the connecting bends 13 between the spans may be separated by approximately the distance shown, but these bends may be more widely separated, as shown in the modification illustrated in Figs. 3 and 4, wherein the conduit C' is of oblong cross section, so that the bends 23 lie in the angles between the supporting structure and the inner ends of the substantially U-shaped spans 21 and 22. The attaching members 25, 26 and 27 are of like structure to those shown in Figs. 1 and 2 and hence require no further description.

Figure 5:
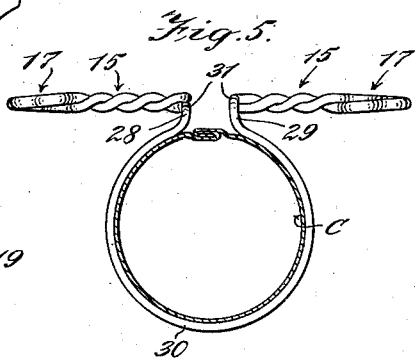
Fig. 5 illustrates another modification.

Those skilled in the art are aware that it is desirable at times to provide a space between the leader and the wall surface; for instance, when the leader is applied to a wooden building and painting behind the leader is necessary, and when such spacing is necessary or desirable the bracket may have its spans, as 30 (see Fig. 5), of such extent and so bent and extended rearwardly, as at 28 and 29, that the upright portions 31 connecting the spans will be displaced at any desired distance from the circular portions of the spans. The extent of such displacement will conform to the needs of particular installations.

Figure 6:
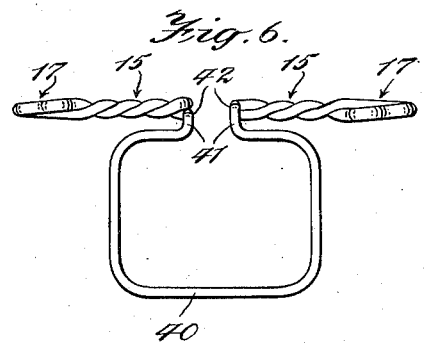
Fig. 6 illustrates still another modification similar to that shown in Fig. 5, except that it shows the invention as applied to a leader of oblong cross-section.

In Fig. 6, the same adaptation is illustrated for use with a conduit of the oblong type shown at C' in Figs. 3 and 4, which conduit however, is not shown in Fig. 6. The spans, as 40, are connected by offset horizontal bends 41 to the vertical bends 42.

It will be clear from the foregoing that in each of the forms shown, by way of illustration merely, the structural elements of the bracket are substantially identical, and that an endless variety of forms may be provided, to fit any type of conduit, electrical cables, or other similar device to be supported by making appropriate bends in the wire components; also that it is not necessary to keep in stock a large variety of shapes, inasmuch as dealers in fittings of this character are usually equipped to make the necessary changes as to shape and size, if these cannot be conveniently made on the job. Insofar as leaders specifically are concerned these are usually standardized as to size and shape so that one would have to provide only brackets for the round and oblong shapes for positioning them both as against the building wall and as suitably spaced therefrom.

I prefer to make the brackets each of one piece of wire, as illustrated, although this is not essential to the successful practice of the invention, it being readily understood that a device of the character described is of simple construction, and cheap to manufacture, whether made of one or more pieces of wire; that it may be applied readily and quickly; and that it is not only efficient in operation but is ornamental in character, thus carrying into effect the objects of the invention as stated in the opening paragraphs of this specification.

An outstanding feature of the improved bracket herein shown, and common to all of the forms illustrated, is constituted not only by the wide bearings afforded by spacing apart the component spans along the length of the conduit and transversely of its circumference; but also by the formation of the broad terminal loops, as 17, at each end of the attaching members. Great stability is afforded by the combination of the aforesaid structural features, without adding unduly to the bulk of the bracket or to the amount of material required.

I claim:

As a new article of manufacture, an attaching bracket for a conduit of the class described; said bracket comprising a brace of wire spans each so fabricated as to conform to the contour of the conduit and fit snugly thereupon in partially encircling circumferential relationship, said spans being spaced apart lengthwise of the major axis of the conduit, and the wire of each span being bent near each end of the span toward the corresponding wire end of the other span; said wire ends being associated in interlocking engagement to form an attaching member common to both spans at each end thereof.

JOSEPH A. PETERMAN.